(12) United States Patent
Harrington et al.

(10) Patent No.: US 11,794,172 B2
(45) Date of Patent: Oct. 24, 2023

(54) EXHAUST TREATMENT SYSTEM INCLUDING NICKEL-CONTAINING CATALYST

(71) Applicant: Ford Global Technologies, LLC, Dearborn, MI (US)

(72) Inventors: Rachael Jean Harrington, South Lyon, MI (US); Eva Thanasiu, Trenton, MI (US); Hungwen Jen, Troy, MI (US); Giovanni Cavataio, Dearborn, MI (US); Jeffrey Scott Hepburn, Birmingham, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/446,425

(22) Filed: Aug. 30, 2021

(65) Prior Publication Data

US 2021/0387170 A1    Dec. 16, 2021

Related U.S. Application Data

(62) Division of application No. 16/512,305, filed on Jul. 15, 2019, now Pat. No. 11,167,272.

(51) Int. Cl.
*B01J 21/04*    (2006.01)
*B01J 23/10*    (2006.01)
(Continued)

(52) U.S. Cl.
CPC ........ *B01J 23/755* (2013.01); *B01D 46/0027* (2013.01); *B01D 53/945* (2013.01);
(Continued)

(58) Field of Classification Search
CPC ... B01J 21/04; B01J 23/10; B01J 23/42; B01J 23/44; B01J 23/464; B01J 23/755;
(Continued)

(56) References Cited

U.S. PATENT DOCUMENTS 8,506,912 B1    8/2013    Hepburn et al.
8,512,657 B2    8/2013    Arnold et al.
(Continued)

OTHER PUBLICATIONS

Choudhary, T. et al., "Catalytic ammonia decomposition: COx-free hydrogen production for fuel cell applications," Catalysis Letters, vol. 72. No. 3-4, Apr. 2001, 5 pages.

*Primary Examiner* — Cam N. Nguyen
(74) *Attorney, Agent, or Firm* — Vincent Mastrogiacomo; McCoy Russell LLP

(57) ABSTRACT

Methods are provided for emissions control of a vehicle. In one example, a catalyst may include a cerium-based support material and a transition metal catalyst loaded on the support material, the transition metal catalyst including nickel and copper, wherein nickel in the transition metal catalyst is included in a monatomic layer loaded on the support material. In some examples, limiting nickel to the monatomic layer may mitigate extensive transition metal catalyst degradation ascribed to sintering of thicker nickel washcoat layers. Further, by utilizing the cerium-based support material, side reactions involving nickel in the transition metal catalyst with other support materials may be prevented.

10 Claims, 10 Drawing Sheets

(51) Int. Cl.
- *B01J 23/42* (2006.01)
- *B01J 23/44* (2006.01)
- *B01J 23/46* (2006.01)
- *B01J 23/755* (2006.01)
- *B01J 35/00* (2006.01)
- *B01J 35/04* (2006.01)
- *B01D 53/94* (2006.01)
- *B01D 46/00* (2022.01)
- *F01N 3/035* (2006.01)
- *F01N 3/10* (2006.01)
- *F01N 3/28* (2006.01)

(52) U.S. Cl.
CPC .............. *B01J 21/04* (2013.01); *B01J 23/10* (2013.01); *B01J 23/42* (2013.01); *B01J 23/44* (2013.01); *B01J 23/464* (2013.01); *B01J 35/0006* (2013.01); *B01J 35/0066* (2013.01); *B01J 35/04* (2013.01); *F01N 3/035* (2013.01); *F01N 3/101* (2013.01); *F01N 3/2825* (2013.01); *B01D 2255/1021* (2013.01); *B01D 2255/1023* (2013.01); *B01D 2255/1025* (2013.01); *B01D 2255/2065* (2013.01); *B01D 2255/20753* (2013.01); *B01D 2255/20761* (2013.01); *B01D 2255/908* (2013.01); *B01D 2255/9022* (2013.01); *F01N 2330/06* (2013.01); *F01N 2370/02* (2013.01); *F01N 2510/06* (2013.01)

(58) Field of Classification Search
CPC .... B01J 35/0006; B01J 35/0066; B01J 35/04; B01D 53/945; B01D 46/0027; F01N 3/035; F01N 3/101; F01N 3/2825
USPC ....................................................... 423/213.5
See application file for complete search history.

(56) References Cited

U.S. PATENT DOCUMENTS

| | | |
|---|---|---|
| 8,530,372 B2 | 9/2013 | Luo et al. |
| 8,765,985 B2 | 7/2014 | Hora et al. |
| 8,809,217 B2 | 8/2014 | Andersen et al. |
| 8,919,110 B2 | 12/2014 | Arnold et al. |
| 9,314,775 B2 | 4/2016 | Nitta et al. |
| 9,403,157 B2 | 8/2016 | Jen et al. |
| 9,463,447 B2 | 8/2016 | Cavataio et al. |
| 9,579,638 B2 | 2/2017 | Fedeyko et al. |
| 9,581,063 B2 | 2/2017 | Klingmann et al. |
| 9,630,146 B2 | 4/2017 | Warner et al. |
| 9,757,719 B2 | 9/2017 | Fedeyko et al. |
| 9,914,095 B1 * | 3/2018 | Getsoian ................ F01N 3/101 |
| 10,105,692 B2 * | 10/2018 | Andersen ........... B01D 53/8634 |
| 10,188,987 B2 | 1/2019 | Li et al. |
| 10,260,395 B2 | 4/2019 | Li et al. |
| 10,376,838 B2 * | 8/2019 | Andersen ............. B01D 53/944 |
| 10,450,918 B2 * | 10/2019 | Xue ........................ F01N 3/103 |
| 10,532,344 B2 * | 1/2020 | Chandler ................. B01J 35/04 |
| 10,669,910 B2 | 6/2020 | Chen et al. |
| 10,792,615 B2 | 10/2020 | Li et al. |
| 10,828,623 B2 | 11/2020 | Nunan et al. |
| 10,850,264 B2 | 12/2020 | Nunan et al. |
| 10,906,032 B2 | 2/2021 | Zheng et al. |
| 11,167,273 B2 * | 11/2021 | Zheng ..................... B01J 23/44 |
| 11,285,467 B2 * | 3/2022 | Clowes ................. B01D 53/86 |
| 2004/0255284 A1 | 12/2004 | Kobayashi |
| 2009/0324468 A1 | 12/2009 | Golden et al. |
| 2014/0255284 A1 | 9/2014 | Alden et al. |
| 2015/0352530 A1 | 12/2015 | Nagao et al. |
| 2016/0367963 A1 | 12/2016 | Cavataio et al. |
| 2018/0318800 A1 | 11/2018 | Chandler et al. |
| 2018/0318801 A1 | 11/2018 | Chandler et al. |
| 2022/0001370 A1 * | 1/2022 | Zheng ..................... F01N 3/281 |
| 2022/0025796 A1 * | 1/2022 | Vjunov .................... B01J 23/72 |

* cited by examiner

EXHAUST TREATMENT SYSTEM INCLUDING NICKEL-CONTAINING CATALYST

CROSS-REFERENCE TO RELATED APPLICATIONS

The present application is a divisional of U.S. patent application Ser. No. 16/512,305, entitled "EXHAUST TREATMENT SYSTEM INCLUDING NICKEL-CONTAINING CATALYST", and filed on Jul. 15, 2019. The entire contents of the above-listed application are hereby incorporated by reference for all purposes.

FIELD

The present description relates generally to systems and methods for treating exhaust emissions from a vehicle engine.

BACKGROUND/SUMMARY

To reduce release of certain emissions from an engine of a vehicle, component catalysts of exhaust gas treatment systems have been developed to mitigate one or more chemical species in the engine exhaust gas in tandem with other component catalysts of such exhaust gas treatment systems. As examples, nitrogen oxide ($NO_x$), hydrocarbon (HC), and carbon monoxide (CO) emissions may be controlled via such catalysts.

For example, nickel (Ni) containing transition metal (TM) catalysts may be employed as a low-cost alternative to platinum group metal (PGM) (e.g., Pt, Pd, Rh) containing three-way catalysts (TWCs), and have further been found to actively convert vehicle exhaust pollutants (e.g., $NO_x$, HC, and CO emissions) at high operating temperatures. In some examples, such TM catalysts have been shown to exhibit greater oxygen storage and water-gas shift (WGS) functionalities than PGM-based TWCs. In one example approach, as shown by Jen et al. in U.S. Pat. No. 9,403,157, a nickel-copper washcoated TWC is disclosed which provides such enhanced oxygen storage and WGS functions. However, the inventors herein have recognized issues with the above approach. For example, thicker washcoats of Ni may sinter under typical use conditions, causing significant degradation in catalyst activity. Further, though copper (Cu) may promote lower temperature activity of Ni, Cu also promotes the undesired formation of nitric oxide (NO, a $NO_x$ species) from ammonia ($NH_3$) present in the exhaust emissions, which may reduce or eliminate the aforementioned positive promotional effects of Cu on emissions control. Additionally, when the TM catalyst washcoat is disposed on certain support materials (e.g., alumina), undesirable side reactions may render the Ni inactive (e.g., the formation of nickel aluminate).

Accordingly, the inventors herein have provided systems and methods to at least partly address the above issues. One example includes a catalyst including a support material comprising one or more of cerium metal, ceria, and high-cerium cerium-zirconium oxide, and a transition metal catalyst loaded on the support material, the transition metal catalyst comprising nickel and copper, wherein nickel in the transition metal catalyst is included in a monatomic layer loaded on the support material. In this way, a nickel containing transition metal catalyst is provided which improves oxygen storage capacity and water-gas shift functionality, and mitigates ammonia and nitric oxide production across a broad temperature range.

As one example, by using a cerium-based support material, undesired reactions of the Ni included in the TM catalyst with other support materials (e.g., alumina) which may render the Ni inactive may be prevented. As another example, by including the Ni in a monatomic layer, TM catalyst degradation ascribed to sintering of thicker Ni washcoats may be significantly reduced. Additionally, in some examples, the Cu in the TM catalyst may be limited to a Cu:Ni ratio of 1:49, hampering $NO_x$ formation while providing lower temperature TM catalyst activity.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

The following description relates to systems and methods for treating exhaust emissions with an exhaust treatment system including a nickel-based catalyst. For example, an engine, such as the engine system shown in FIG. 1, may include the exhaust gas treatment system, such as the exhaust gas treatment system shown in FIGS. 1 and 2, including the nickel-based catalyst. Various embodiments of the nickel-based catalyst are depicted in FIGS. 3A-3C.

Figure 4:
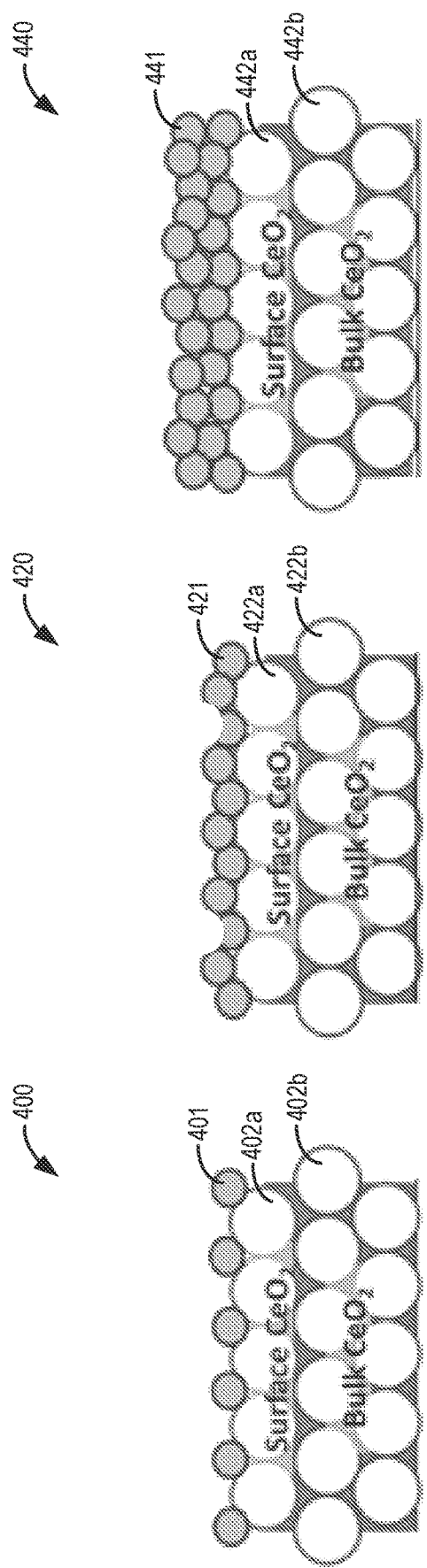
FIG. 4 shows schematic diagrams of various example loadings of nickel on a cerium-based support material.

Further, various possible nickel loadings of the nickel-based catalyst are depicted in FIG. 4.

Figure 3A:
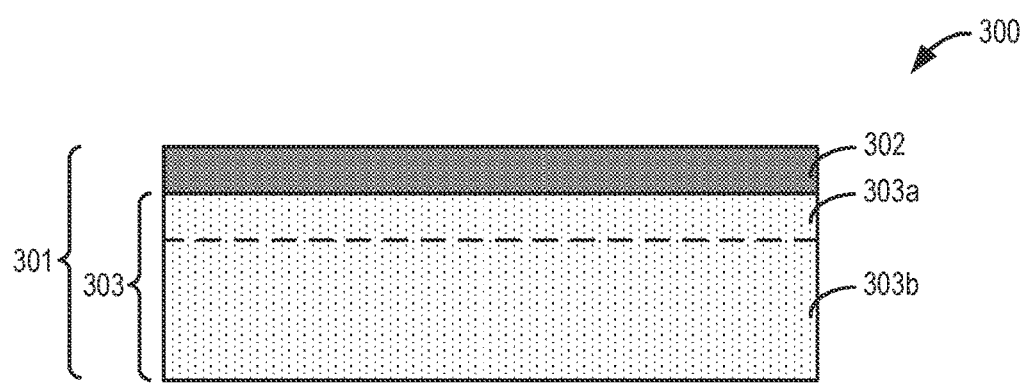
FIG. 3A shows a schematic illustration of a first example of a catalyst including nickel loaded on a support material.
Figure 3B:
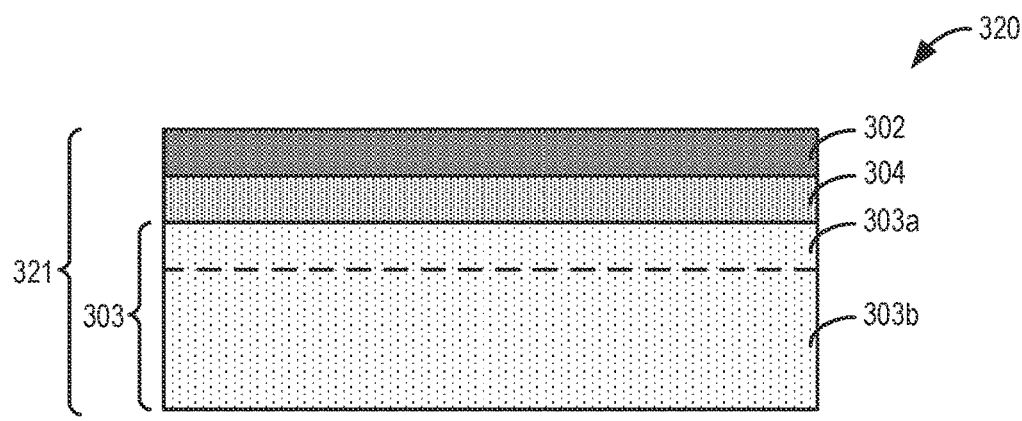
FIG. 3B shows a schematic illustration of a second example of the catalyst including nickel loaded on the support material.
Figure 3C:
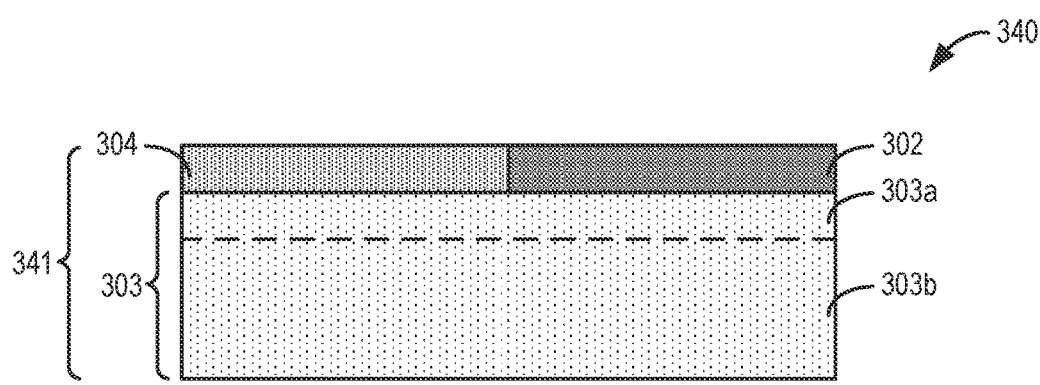
FIG. 3C shows a schematic illustration of a third example of the catalyst including nickel loaded on the support material.
Figure 5A:
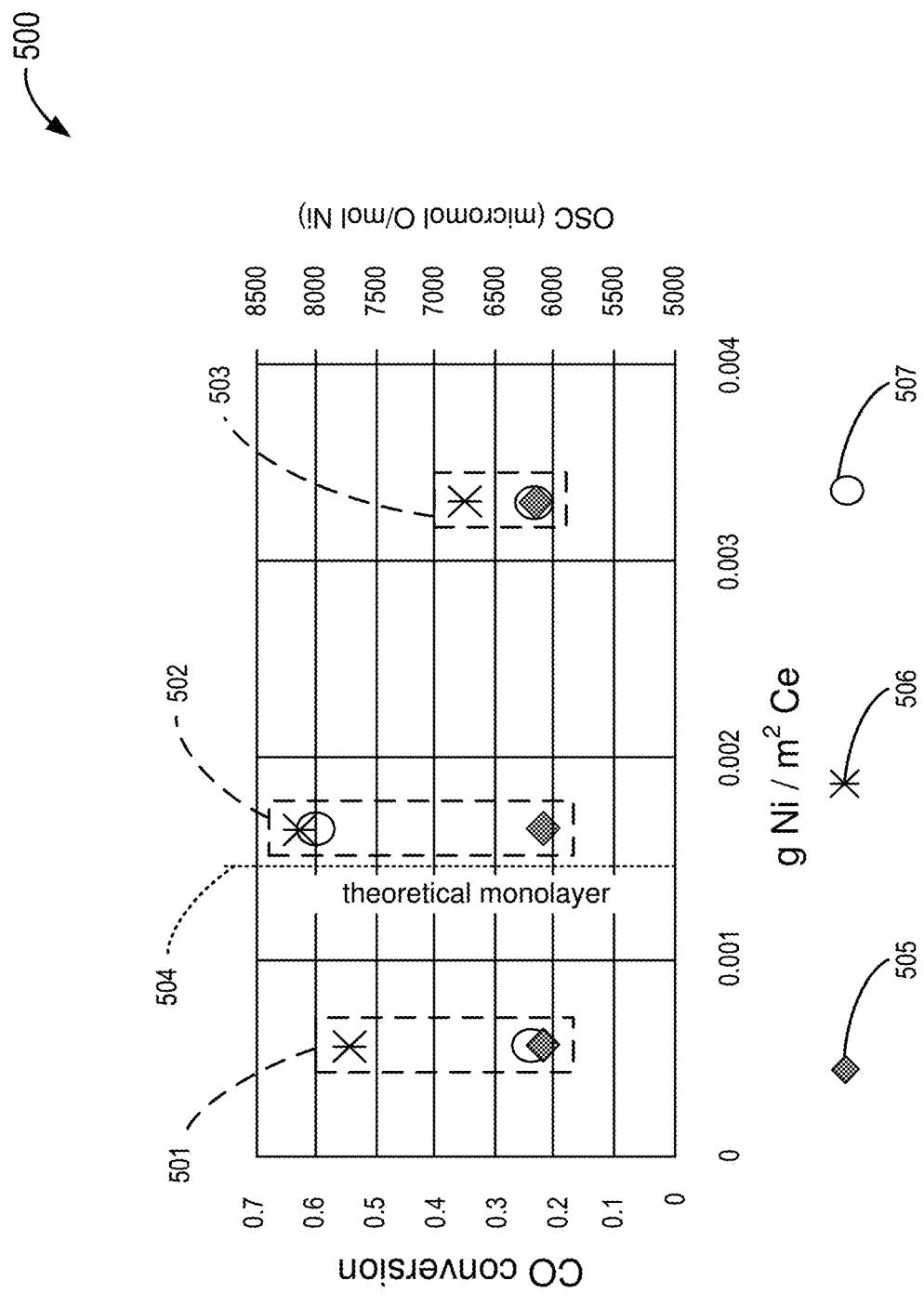
FIG. 5A shows an example plot of various catalytic functions of three example catalysts at 500° C.
Figure 5B:
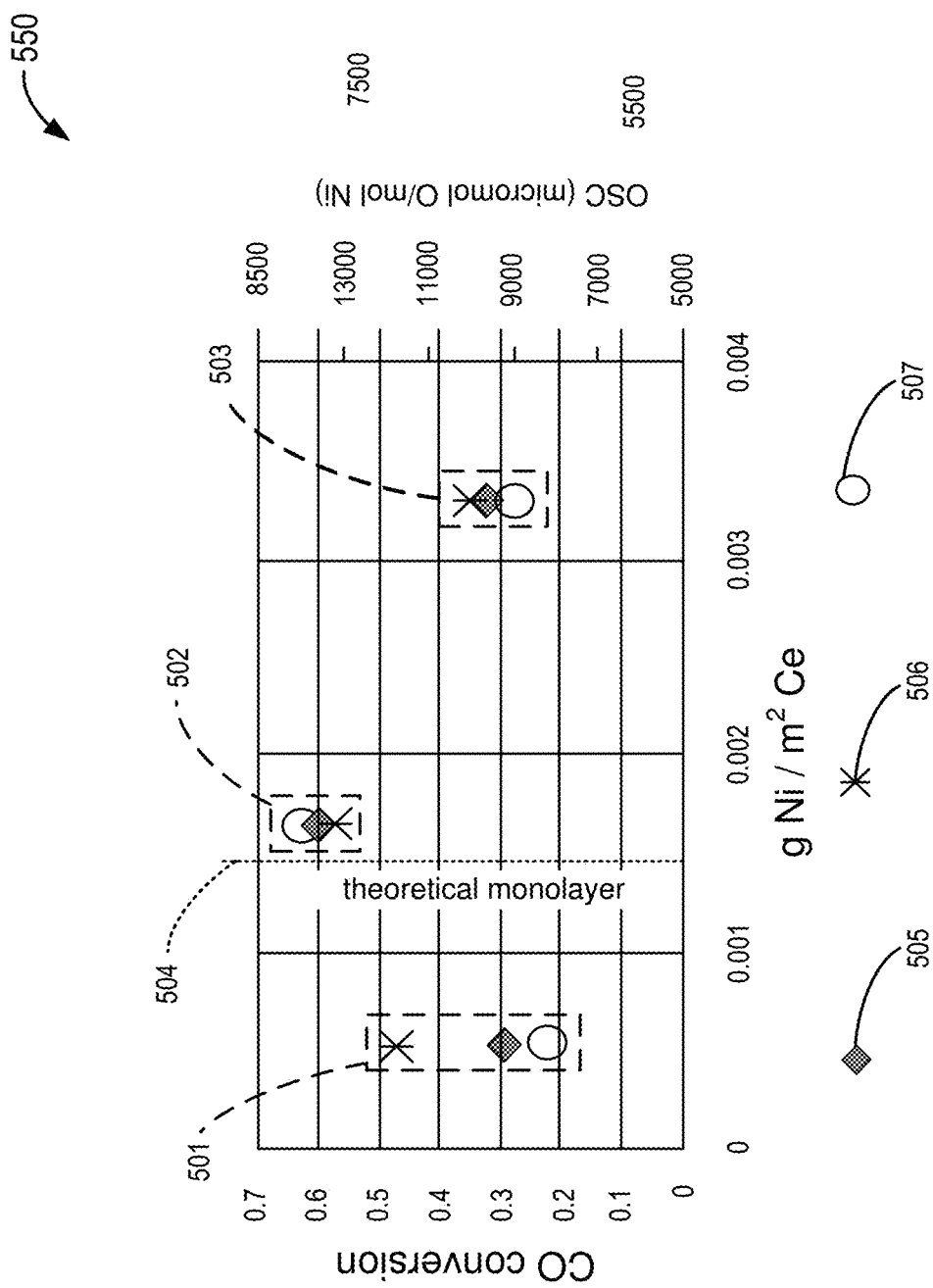
FIG. 5B shows an example plot of various catalytic functions of three example catalysts at 600° C.
Figure 6:
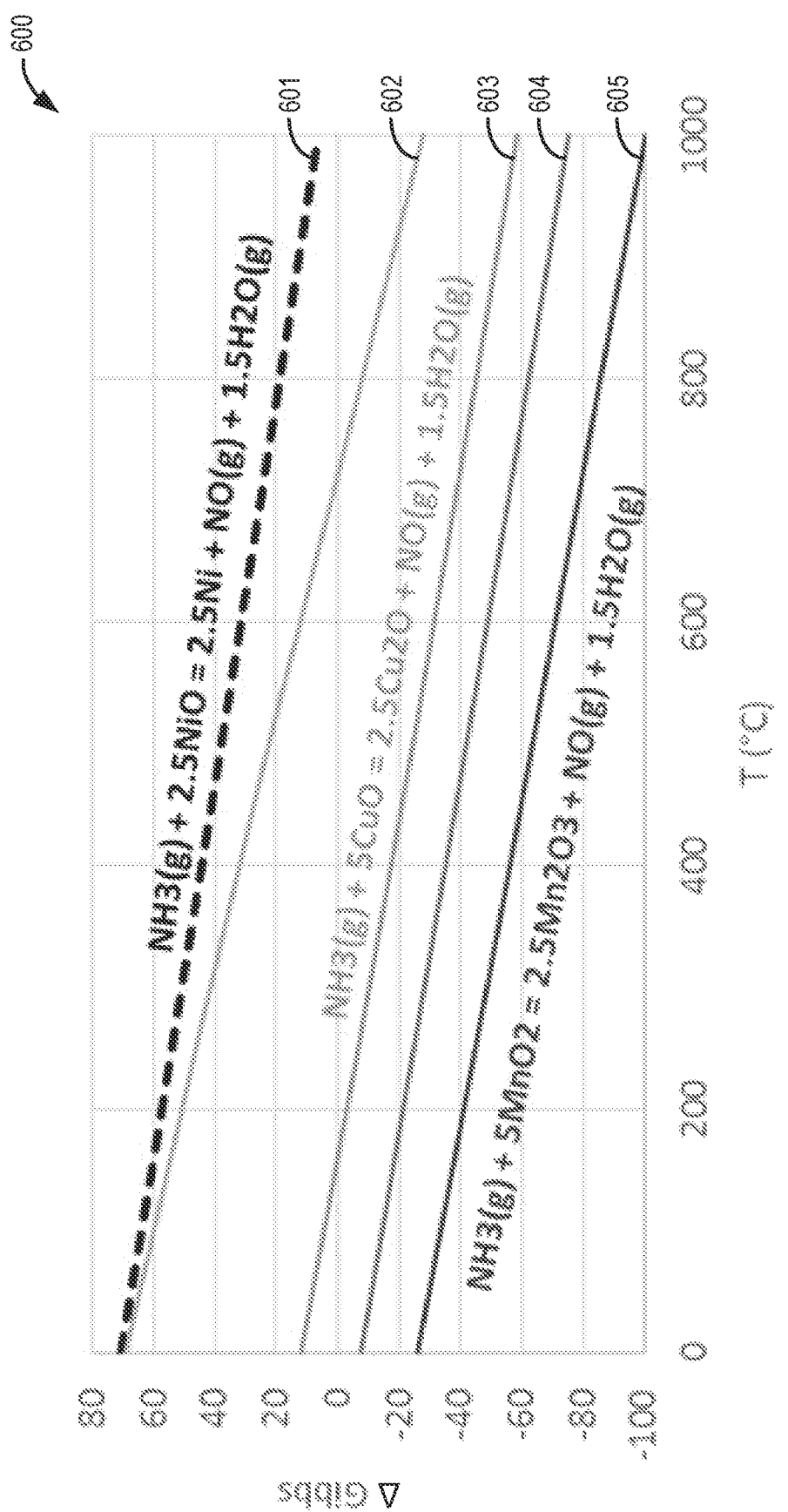
FIG. 6 shows an example plot of Gibbs free energies of formation of nitric oxide (NO) from respective reactions of various metal oxides with ammonia ($NH_3$).
Figure 7:
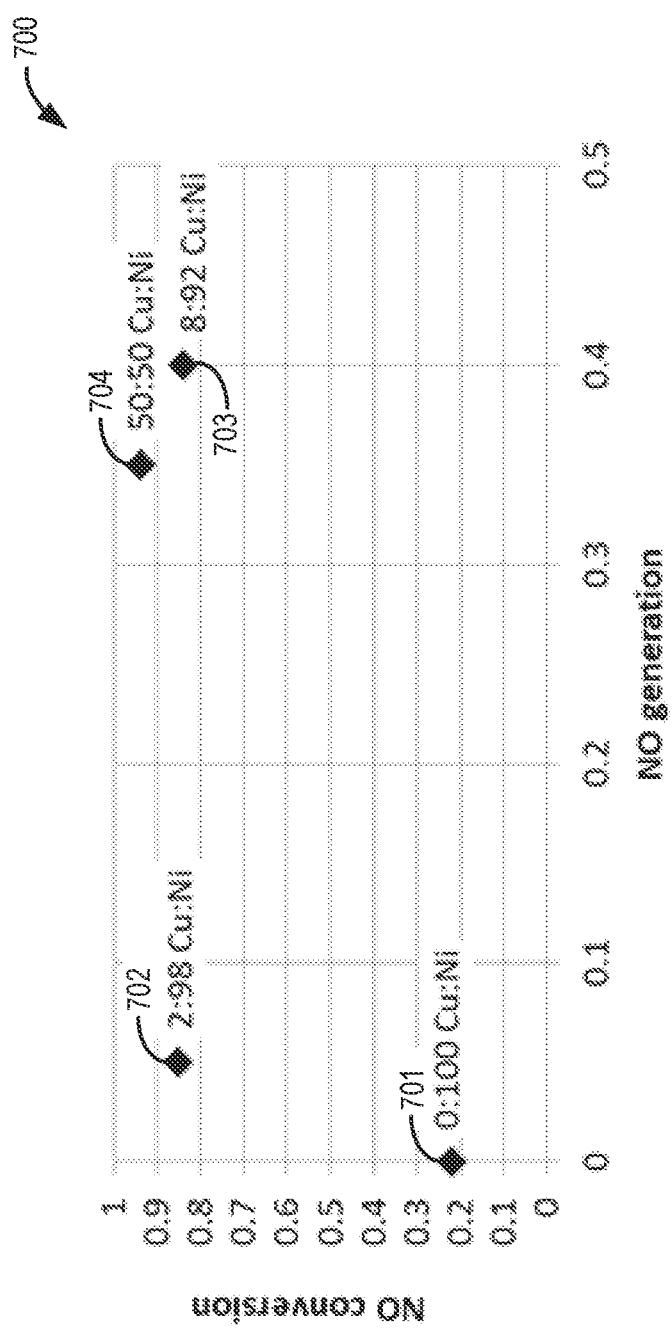
FIG. 7 shows an example plot of NO conversion and NO generation of example transition metal catalyst washcoats including various respective copper:nickel ratios.
Figure 8A:
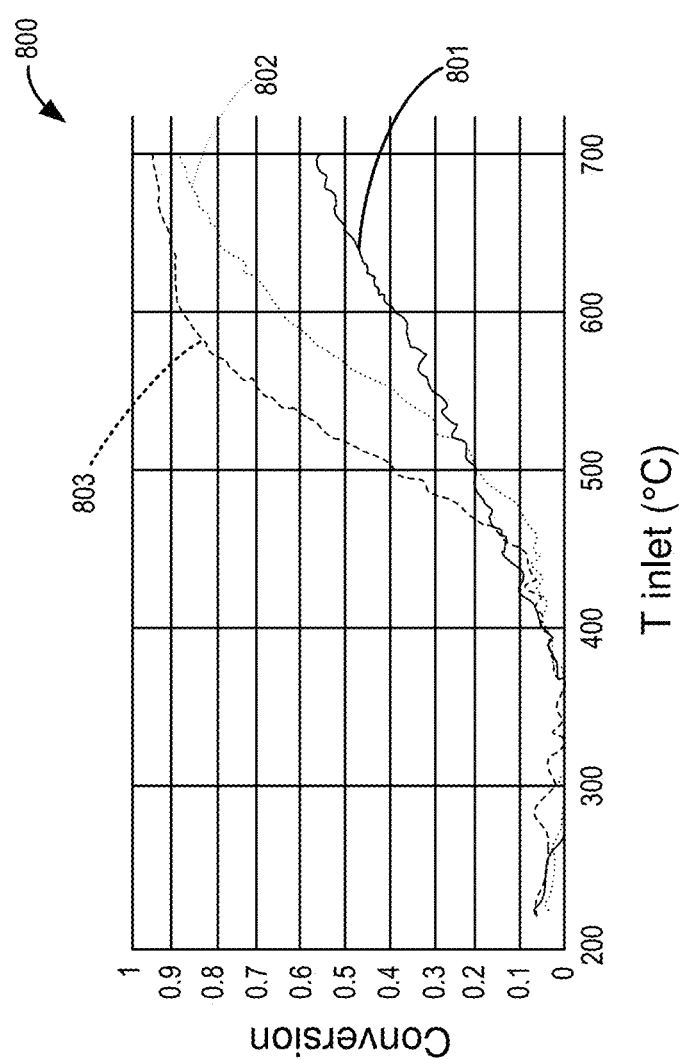
FIG. 8A shows an example plot of $NH_3$ conversion of various exhaust gas treatment systems as a function of exhaust gas temperature.
Figure 8B:
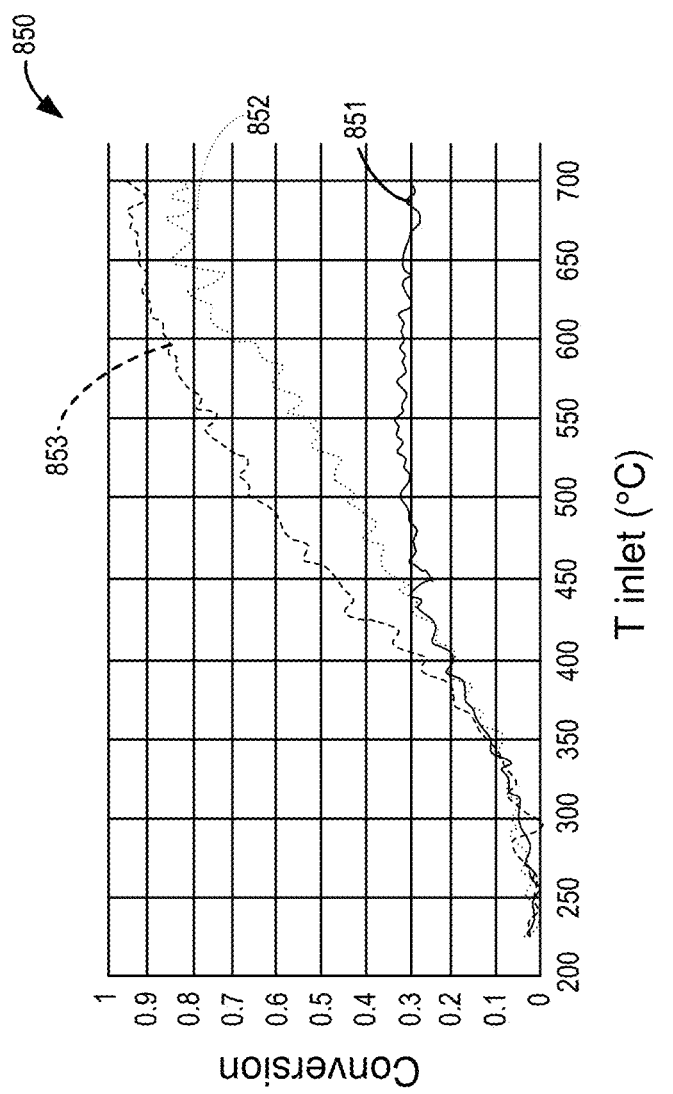
FIG. 8B shows an example plot of NO conversion of various exhaust gas treatment systems as a function of exhaust gas temperature.

Various catalytic functions of the nickel-based catalyst of FIGS. 3A-3C under exhaust gas temperatures of 500° C. and 600° C. are depicted in FIGS. 5A and 5B, respectively. Example Gibbs free energies of formation of nitric oxide (NO) resulting from respective reactions of various metal oxides with ammonia ($NH_3$) are depicted in FIG. 6. Effects of varying a copper:nickel ratio of the nickel-based catalyst on NO conversion and NO generation are depicted in FIG. 7. FIGS. 8A and 8B respectively depict $NH_3$ conversion and NO conversion of various exhaust gas treatment systems with respect to exhaust gas temperature.

FIGS. 1-3C show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. It will be appreciated that one or more components referred to as being "substantially similar and/or identical" differ from one another according to manufacturing tolerances (e.g., within 1-5% deviation). Further, as used herein "about" may refer to a numerical value having a tolerance or deviation of up to 10%.

Figure 1:
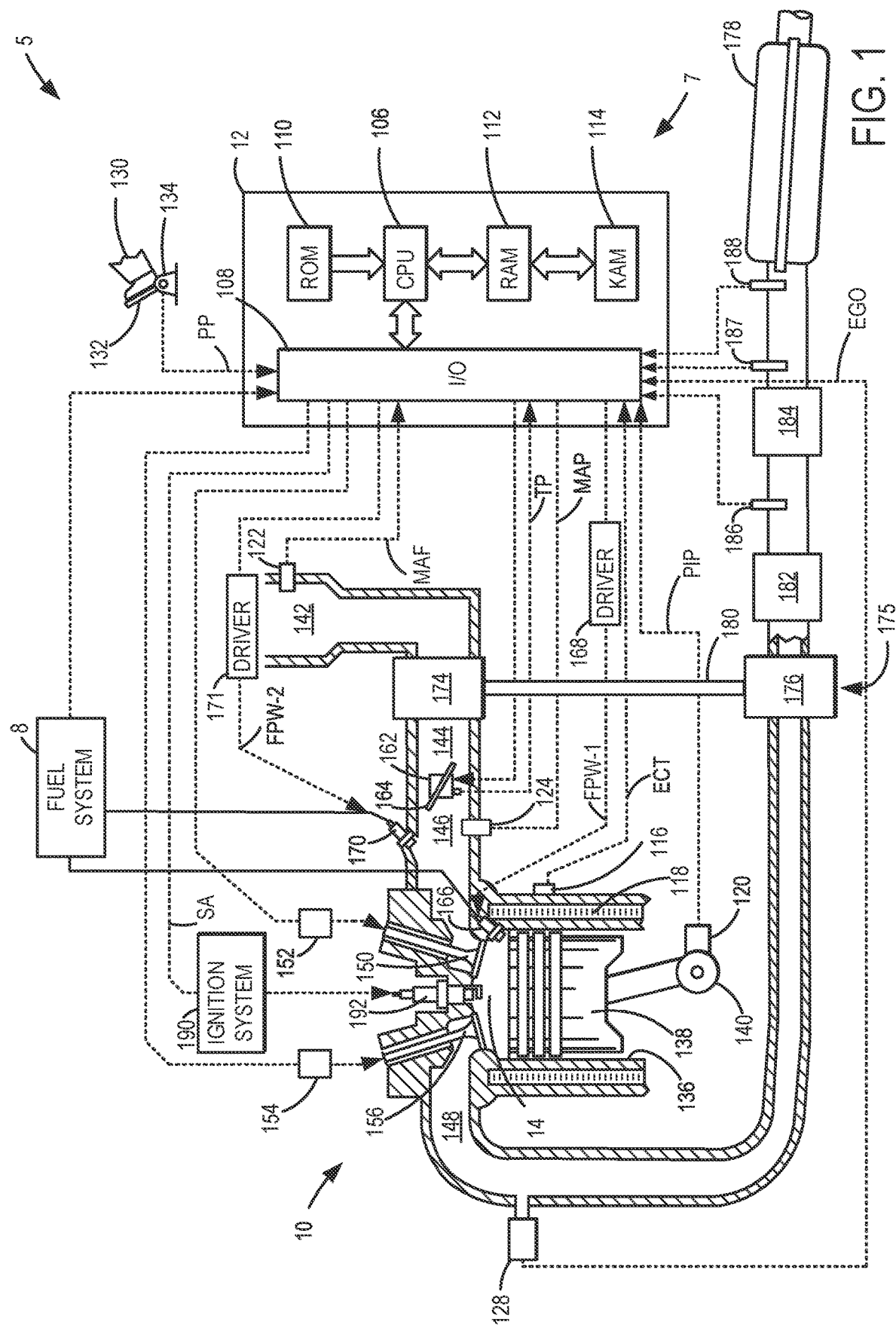
FIG. 1 shows a schematic diagram of an example cylinder of a multi-cylinder engine with an example exhaust gas treatment system.

Referring now to FIG. 1, an example of a cylinder of internal combustion engine 10 included in an engine system 7 of vehicle 5 is depicted. Engine 10 may be controlled at least partially by a control system including controller 12 and by input from a vehicle operator 130 via an input device 132. In this example, input device 132 includes an accelerator pedal and a pedal position sensor 134 for generating a proportional pedal position signal PP. Cylinder 14 (which may be referred to herein as a combustion chamber) of engine 10 may include combustion chamber walls 136 with piston 138 positioned therein. Piston 138 may be coupled to crankshaft 140 so that reciprocating motion of the piston is translated into rotational motion of the crankshaft. Crankshaft 140 may be coupled to at least one drive wheel of the passenger vehicle via a transmission system. Further, a starter motor (not shown) may be coupled to crankshaft 140 via a flywheel to enable a starting operation of engine 10.

Cylinder 14 can receive intake air via a series of intake air passages 142, 144, and 146. Intake air passage 146 can communicate with other cylinders of engine 10 in addition to cylinder 14. FIG. 1 shows engine 10 configured with a turbocharger 175 including a compressor 174 arranged between intake passages 142 and 144, and an exhaust turbine 176 arranged along exhaust passage 148. Compressor 174 may be at least partially powered by exhaust turbine 176 via a shaft 180. A throttle 162 including a throttle plate 164 may be provided along an intake passage of the engine for varying the flow rate and/or pressure of intake air provided to the engine cylinders. For example, throttle 162 may be positioned downstream of compressor 174 as shown in FIG. 1, or alternatively may be provided upstream of compressor 174.

Exhaust passage 148 can receive exhaust gases from other cylinders of engine 10 in addition to cylinder 14. Exhaust gas sensor 128 is shown coupled to exhaust passage 148 upstream of emission control device 178 (and upstream of first catalyst 182 and second catalyst 184). Sensor 128 may be selected from among various suitable sensors for providing an indication of exhaust gas air-fuel ratio such as a linear oxygen sensor or UEGO (universal or wide-range exhaust gas oxygen), a two-state oxygen sensor or EGO (as depicted), a HEGO (heated EGO), an HC, CO, or $NO_x$ sensor, for example.

Herein, when referring to components (e.g., sensors, emission treatment devices, etc.) disposed in the exhaust passage 148, "upstream" may refer to a position of one component being closer to the engine 10 than a position of another component; similarly, "downstream" may refer to a position of one component being farther from the engine 10 than a position of another component.

Emission control device 178 may be a three way catalyst (TWC), HC trap, $NO_x$ trap, various other emission control devices, or combinations thereof. In one example, the emission control device 178 is arranged in a far vehicle underbody (UB). Comparatively, this location may be downstream of a close-coupled (CC) catalyst location, such as the location of first catalyst 182. In this way, the first catalyst 182 is arranged upstream of the emission control device 178. In one example, the first catalyst 182 may be a TWC, particulate filter (PF), a transition metal catalyst, or combinations thereof. In one example, the first catalyst 182 may include a TWC washcoat including one or more platinum group metals (PGMs) (e.g., Pt, Pd, Rh) over inert alumina on a ceramic honeycomb flow-through monolith.

A second catalyst 184 may be arranged in a location between the first catalyst 182 and the emission control device 178. In this way, the second catalyst 184 is arranged downstream of the first catalyst 182 and upstream of the emission control device 178. The second catalyst 184 may be closer to the first catalyst 182 than the emission control device 178. In one example, the second catalyst 184 may be a TWC, PF, a transition metal catalyst, or a combination thereof. In one example, the second catalyst 184 may include a transition metal catalyst including a monatomic layer of nickel (Ni) washcoated on a support material, such as the in the example catalyst configurations described below with reference to FIGS. 3A-3C.

It will be appreciated that while the depicted example shows three distinct emissions treatment devices (e.g., the emission control device 178, the first catalyst 182, and second catalyst 184) coupled to the exhaust passage 148, in other examples, a larger or smaller number of emissions treatment devices may be present. Further, multiple copies of a given emissions treatment device may be present in the depicted order, or in a different order. As to the depicted order, functions of component catalysts may be dependent upon one another to effectively treat exhaust emissions. For example, by positioning a less kinetically active transition metal catalyst in between more kinetically active PGM-containing TWCs, a greater conversion efficiency of the exhaust gas treatment system as a whole may be achieved than were the transition metal catalyst positioned furthest downstream in the exhaust passage 148.

A difference between the CC location and the far vehicle UB location may include a distance from the engine, wherein the CC location is closer to the engine than the far vehicle UB location. That is to say, components in the CC location are upstream of components in the far vehicle UB location. Further, exhaust gas temperatures experienced by components in the CC location may be higher than temperatures experienced by components in the far vehicle UB position.

A first sensor 186 may be arranged between the first catalyst 182 and the second catalyst 184. Further, a second sensor 187 and a third sensor 188 may be arranged between the second catalyst 184 and the emission control device 178. In some examples, the second sensor 187 may be closer to the second catalyst 184 than the emission control device 178, and the third sensor 188 may be closer to the emission control device 178 than the second catalyst 184. Sensors 186, 187, and 188 may include one or more of a temperature sensor, an exhaust gas sensor (e.g., an HC, CO, or $NO_x$ sensor), an oxygen sensor, a pressure sensor, and the like. In some examples, feedback from the sensors 186, 188, and/or 188 may be used by the controller 12 to infer degradation of one or more of the emissions treatment devices and notify the operator of any inferred degradation.

It will be appreciated that while the depicted example shows three distinct sensors 186, 187, and 188 coupled to the exhaust passage 148, in other examples, a larger or smaller number of sensors may be present. Further, multiple copies of a given sensor may be present in the depicted order, or in a different order.

Each cylinder of engine 10 may include one or more intake valves and one or more exhaust valves. For example, cylinder 14 is shown including at least one intake poppet valve 150 and at least one exhaust poppet valve 156 located at an upper region of cylinder 14. In some examples, each cylinder of engine 10, including cylinder 14, may include at least two intake poppet valves and at least two exhaust poppet valves located at an upper region of the cylinder.

Intake valve 150 may be controlled by controller 12 via actuator 152. Similarly, exhaust valve 156 may be controlled by controller 12 via actuator 154. During some conditions, controller 12 may vary the signals provided to actuators 152 and 154 to control the opening and closing of the respective intake and exhaust valves. The position of intake valve 150 and exhaust valve 156 may be determined by respective valve position sensors (not shown). The valve actuators may be of the electric valve actuation type or cam actuation type, or a combination thereof. The intake and exhaust valve timing may be controlled concurrently or any of a possibility of variable intake cam timing, variable exhaust cam timing, dual independent variable cam timing or fixed cam timing may be used. Each cam actuation system may include one or more cams and may utilize one or more of cam profile switching (CPS), variable cam timing (VCT), variable valve timing (VVT), and/or variable valve lift (VVL) systems that may be operated by controller 12 to vary valve operation.

For example, cylinder 14 may alternatively include an intake valve controlled via electric valve actuation and an exhaust valve controlled via cam actuation including CPS and/or VCT. In other examples, the intake and exhaust valves may be controlled by a common valve actuator or actuation system, or a variable valve timing actuator or actuation system.

Cylinder 14 can have a compression ratio, which is the ratio of volumes when piston 138 is at bottom center to top center. In one example, the compression ratio is in the range of 9:1 to 10:1. However, in some examples where different fuels are used, the compression ratio may be increased. This may happen, for example, when higher octane fuels or fuels with higher latent enthalpy of vaporization are used. The compression ratio may also be increased if direct injection is used due to its effect on engine knock.

In some examples, each cylinder of engine 10 may include a spark plug 192 for initiating combustion. Ignition system 191 may provide an ignition spark to cylinder 14 via spark plug 192 in response to spark advance signal SA from controller 12, under select operating modes. However, in some embodiments, spark plug 192 may be omitted, such as where engine 10 may initiate combustion by auto-ignition or by injection of fuel as may be the case with some diesel engines.

In some examples, each cylinder of engine 10 may be configured with one or more fuel injectors for providing fuel thereto. As a non-limiting example, cylinder 14 is shown including two fuel injectors 166 and 170. Fuel injectors 166 and 170 may be configured to deliver fuel received from fuel system 8. Fuel system 8 may include one or more fuel tanks, fuel pumps, and fuel rails. Fuel injector 166 is shown coupled directly to cylinder 14 for injecting fuel directly therein in proportion to the pulse width of signal FPW-1 received from controller 12 via electronic driver 168. In this manner, fuel injector 166 provides what is known as direct injection of fuel into combustion cylinder 14. While FIG. 1 shows injector 166 positioned to one side of cylinder 14, it may alternatively be located overhead of the piston, such as near the position of spark plug 192. Such a position may improve mixing and combustion when operating the engine with an alcohol-based fuel due to the lower volatility of some alcohol-based fuels. Alternatively, the injector may be located overhead and near the intake valve to improve mixing. Fuel may be delivered to fuel injector 166 from a fuel tank of fuel system 8 via a high pressure fuel pump, and a fuel rail. Further, the fuel tank may have a pressure transducer providing a signal to controller 12.

Fuel injector 170 is shown arranged in intake passage 146, rather than in cylinder 14, in a configuration that provides what is known as port fuel injection into the intake port upstream of cylinder 14. Fuel injector 170 may inject fuel, received from fuel system 8, in proportion to the pulse width of signal FPW-2 received from controller 12 via electronic driver 171. Note that a single driver 168 or 171 may be used for both fuel injection systems, or multiple drivers, for example driver 168 for fuel injector 166 and driver 171 for fuel injector 170, may be used, as depicted.

In an alternate example, each of fuel injectors 166 and 170 may be configured as direct fuel injectors for injecting fuel directly into cylinder 14. In still another example, each of fuel injectors 166 and 170 may be configured as port fuel injectors for injecting fuel upstream of intake valve 150. In yet other examples, cylinder 14 may include only a single fuel injector that is configured to receive different fuels from the fuel systems in varying relative amounts as a fuel mixture, and is further configured to inject this fuel mixture either directly into the cylinder as a direct fuel injector or upstream of the intake valves as a port fuel injector.

Fuel may be delivered by both injectors to the cylinder during a single cycle of the cylinder. For example, each injector may deliver a portion of a total fuel injection that is combusted in cylinder 14. Further, the distribution and/or relative amount of fuel delivered from each injector may vary with operating conditions, such as engine load, knock, and exhaust temperature, such as described herein below. The port injected fuel may be delivered during an open intake valve event, closed intake valve event (e.g., substantially before the intake stroke), as well as during both open and closed intake valve operation. Similarly, directly injected fuel may be delivered during an intake stroke, as well as partly during a previous exhaust stroke, during the intake stroke, and partly during the compression stroke, for example. As such, even for a single combustion event, injected fuel may be injected at different timings from the port and direct injector. Furthermore, for a single combustion event, multiple injections of the delivered fuel may be performed per cycle. The multiple injections may be performed during the compression stroke, intake stroke, or any appropriate combination thereof.

Herein, operation of intake valve 150 may be described in greater detail. For example, the intake valve 150 may be moved from a fully open position to a fully closed position, or to any position therebetween. For all conditions being equal (e.g., throttle position, vehicle speed, pressure, etc.), the fully open position allows more air from the intake passage 146 to enter the cylinder 14 than any other position of the intake valve 150. Conversely, the fully closed position may prevent and/or allow the least amount of air from the intake passage 146 to enter the cylinder 14 than any other position of the intake valve 150. Thus, the positions between the fully open and fully closed position may allow varying amounts of air to flow between the intake passage 146 and the cylinder 14. In one example, moving the intake valve 150 to a more open position allows more air to flow from the intake passage 146 to the cylinder 14 than its initial position.

Fuel injectors 166 and 170 may have different characteristics. These include differences in size, for example, one injector may have a larger injection hole than the other. Other differences include, but are not limited to, different spray angles, different operating temperatures, different targeting, different injection timing, different spray characteristics, different locations etc. Moreover, depending on the distribution ratio of injected fuel among injectors 170 and 166, different effects may be achieved.

Fuel tanks in fuel system 8 may hold fuels of different fuel types, such as fuels with different fuel qualities and different fuel compositions. The differences may include different alcohol content, different water content, different octane, different heats of vaporization, different fuel blends, and/or combinations thereof etc. One example of fuels with different heats of vaporization could include gasoline as a first fuel type with a lower heat of vaporization and ethanol as a second fuel type with a greater heat of vaporization. In another example, the engine may use gasoline as a first fuel type and an alcohol containing fuel blend such as E85 (which is approximately 85% ethanol and 15% gasoline) or M85 (which is approximately 85% methanol and 15% gasoline) as a second fuel type. Other feasible substances include water, methanol, a mixture of alcohol and water, a mixture of water and methanol, a mixture of alcohols, etc.

Controller 12 is shown in FIG. 1 as a microcomputer, including microprocessor unit 106, input/output ports 108, an electronic storage medium for executable programs and calibration values shown as non-transitory read only memory chip 110 in this particular example for storing executable instructions, random access memory 112, keep alive memory 114, and a data bus. Controller 12 may receive various signals from sensors coupled to engine 10, in addition to those signals previously discussed, including measurement of inducted mass air flow (MAF) from mass air flow sensor 122; engine coolant temperature (ECT) from temperature sensor 116 coupled to cooling sleeve 118; a profile ignition pickup signal (PIP) from Hall effect sensor 120 (or other type) coupled to crankshaft 140; throttle position (TP) from a throttle position sensor; and absolute manifold pressure signal (MAP) from sensor 124. Engine speed signal, RPM, may be generated by controller 12 from signal PIP. Manifold pressure signal MAP from a manifold pressure sensor may be used to provide an indication of vacuum, or pressure, in the intake manifold. Controller 12 may infer an engine temperature based on an engine coolant temperature.

As described above, FIG. 1 shows only one cylinder of a multi-cylinder engine. As such, each cylinder may similarly include its own set of intake/exhaust valves, fuel injector(s), spark plug, etc. It will be appreciated that engine 10 may include any suitable number of cylinders, including 2, 3, 4, 5, 6, 8, 10, 12, or more cylinders. Further, each of these cylinders can include some or all of the various components described and depicted by FIG. 1 with reference to cylinder 14.

The controller 12 receives signals from the various sensors of FIG. 1 and then may notify the vehicle operator 130 of potential issues and/or employ the various actuators of FIG. 1 to adjust engine operation based on the received signals and instructions stored on a memory of the controller. That is, the non-transitory read-only memory chip 110 may be programmed with non-transitory, computer readable data representing instructions executable by the microprocessor unit 106 for performing the various diagnostic routines. For example, the controller 12 may be operable to generate a notification to the vehicle operator 130 indicating degradation of one or more of the first catalyst 182, the second catalyst 184, and the emission control device 178, as based upon the diagnostic routines using input from one or more sensors 186, 187, and 188. Further, adjusting engine operating parameters based on determined degradation of one or more of the first catalyst 182, the second catalyst 184, and the emission control device 178, may include adjusting fuel injector 170 and/or injector 166, adjusting throttle 162, and so forth, as based upon the diagnostic routines using input from one or more sensors 186, 187, and 188.

Figure 2:
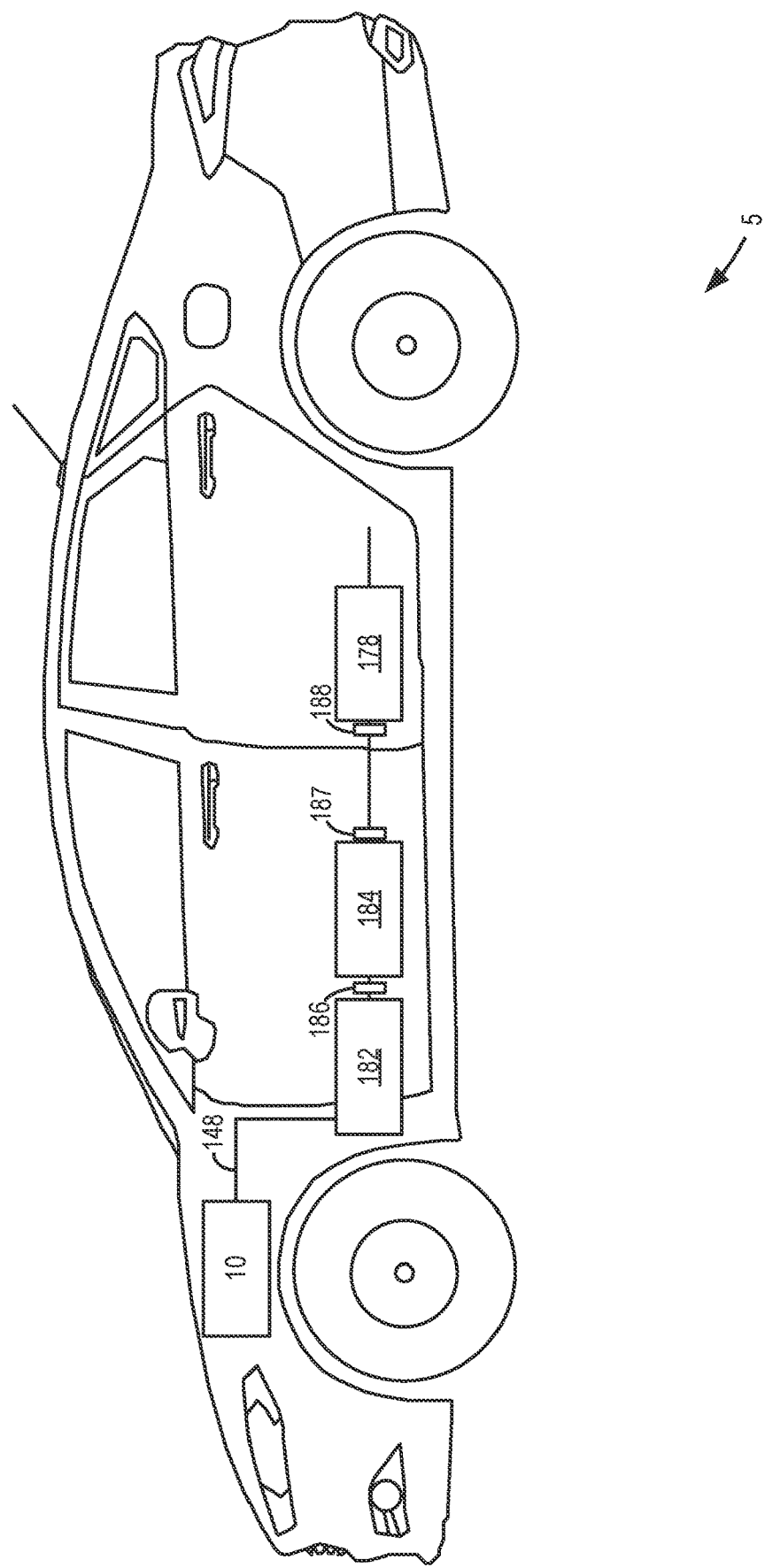
FIG. 2 shows a schematic diagram of the example exhaust gas treatment system within a vehicle.

Referring now to FIG. 2, the vehicle 5 of FIG. 1 is depicted. As such, components previously introduced may be similarly numbered with reference to FIG. 2. The vehicle 5 may include the engine 10, which may be fluidly coupled to the first catalyst 182, the second catalyst 184, and the emission control device via the exhaust passage 148. As described above with reference to FIG. 1, the first catalyst 182 may be arranged in the close-coupled (CC) position, the emission control device 178 may be arranged in the far vehicle underbody (UB) position, and the second catalyst 184 may be arranged between the first catalyst 182 and the emission control device 178.

Exhaust gas may exit the engine 10 through the exhaust passage 148 and flow through each of the first catalyst 182, the second catalyst 184, and the emission control device 178 in sequence before exiting the vehicle 5. Therein, each of the first catalyst 182, the second catalyst 184, and the emission control device 178 may provide one or more catalytic functionalities to treat the exhaust gas. For instance, one of the first catalyst 182, the second catalyst 184, and the emission control device 178 may include a transition metal catalyst washcoat disposed on a cerium-based support material, as described in further detail below with reference to FIGS. 3A-3C. In such examples, the transition metal catalyst washcoat may catalyze decomposition of $NH_3$ in the exhaust gas to nitrogen gas ($N_2$) and hydrogen gas ($H_2$). Further, the transition metal catalyst washcoat may catalyze CO in the exhaust gas by oxidizing carbon monoxide during an induction period and/or via a water-gas shift (WGS) reaction. Additionally, the transition metal catalyst washcoat may store oxygen present in the exhaust gas during certain exhaust gas conditions, for example when an exhaust gas air-fuel ratio is lean, or oxygen-rich, and may subsequently release the stored oxygen during other exhaust gas conditions, for example when the exhaust gas air-fuel ratio is rich, or oxygen-deficient.

The first catalyst 182 may be positioned in the exhaust passage 148 at a close-coupled distance downstream of the engine 10, such as in a range of 13-33 cm downstream of the engine 10. The emission control device 178, which is downstream of the first catalyst 182, may be downstream of the first catalyst 182 by a suitable distance, such as a distance of 25 cm or more. The first catalyst 182 and the emission control device 178 may each include a three-way catalyst (TWC) washcoat. In some examples, each of the TWC washcoats in the first catalyst 182 and the emission control device 178 may include a precious metal, such as platinum, palladium, rhodium, or a combination thereof. The second catalyst 184, which is downstream of the first catalyst 182 and upstream of the emission control device 178 within the exhaust passage 148, may be placed at any location between first catalyst 182 and emission control device 178.

In some examples, the second catalyst 184 may be physically separated from each of the first catalyst 182 and the emission control device 178 (e.g., by respective intervening exhaust passage segments or by another emission treatment device disposed therebetween). For example, the second catalyst 184 may include a transition metal catalyst washcoat including copper (Cu). As such, physical separation of the second catalyst 184 from other emissions treatment devices (e.g., the first catalyst 182, the emission control device 178) including precious metals may prevent Cu poisoning of the other emissions treatment devices.

In other examples, the first catalyst 182 may be adjacent to the second catalyst 184 such that the first catalyst 182 and the second catalyst 184 are directly coupled to one another (e.g., without intervening segments of exhaust passage). As such, for two separately coated monolith substrates, an outlet of the first catalyst 182 and an inlet of the second catalyst 184 may be in face-sharing contact. In additional or alternative examples, the second catalyst 184 may be adjacent to the emission control device 178 such that the second catalyst 184 and the emission control device 178 are directly coupled to one another in a like fashion.

In other examples, the first catalyst 182 and the second catalyst 184 may be zone-coated on the same monolith substrate with materials included in the first catalyst 182 in a front zone and materials included in the second catalyst 184 in a rear zone. Alternatively, the second catalyst 184 and the emission control device 178 may be zone-coated on the same monolith substrate with materials included in the second catalyst 184 in a front zone and materials included in the emission control device 178 in a rear zone.

The first catalyst 182 may be coated on an upstream side of the second catalyst 184, and the emissions control device 178 may be coated on a downstream side of the second catalyst 184. In this way, the second catalyst 184 may function as a physical barrier to separate the first catalyst 182 and the emission control device 178 from one another. In one example, the first catalyst 182 may include a transition metal catalyst washcoat disposed on a cerium-based support material (as described in further detail below with reference to FIGS. 3A-3C), the second catalyst 184 may be a gasoline particulate filter (GPF), and the emission control device 178 may include a TWC washcoat including one or more precious metals (e.g., Pt, Pd, Rh).

The emission control device 178 may experience exhaust gas temperatures lower than exhaust gas temperatures experienced by the first catalyst 182 and the second catalyst 184. This temperature difference may result in the first catalyst 182 and/or the second catalyst 184 degrading more quickly than the emission control device 178. The emission control device 178 may therefore include a first TWC washcoat even in examples wherein one of the first catalyst 182 and the second catalyst 184 includes a second TWC washcoat.

In some examples, the TWC washcoat(s) may include a high loading and dispersion of catalytically active materials, including but not limited to one or more of Pt, Pd, and Rh. These metals may be introduced via spraying a washcoat onto a support material of the emission control device 178, for example. These catalytically active materials may be capable of forming chemisorbed $NO_x$, such as nitrosyl species (e.g., Pd—NO) or dissociated species (e.g., Rh—N and Rh—O). The catalytically active materials may release and/or desorb the $NO_x$ compounds upon reaching a catalytic reduction temperature of $NO_x$. In one example, the catalytic reduction temperature is 200° C. Therefore $NO_x$ is reduced to $N_2$ in conjunction with reductant (i.e., CO, HC) present in sub-stoichiometric exhaust gas in the far UB location. Said another way, the $NO_x$ compounds may be released from the TWC washcoat(s) after being reduced. In one example, the $NO_x$ is not released from the TWC washcoat(s) until it has been reduced to $N_2$.

In one example, the first sensor 186 may be arranged between the first catalyst 182 and the second catalyst 184 as shown. Alternatively, the shown gap between the first catalyst 182 and the second catalyst 184 may be absent. In one example, second sensor 187 and third sensor 188 may be arranged downstream of the second catalyst 184 and upstream of the emission control device 178 such that the second sensor 187 is arranged closer to the second catalyst 184 than the emission control device 178 and the third sensor 188 is arranged closer to the emission control device 178 than the second catalyst 184.

In one example, engine operating parameters may be adjusted based on feedback from one or more of the sensors 186, 187, and 188. For example, if one of the emission treatment devices is determined to be degraded beyond a threshold via a catalyst monitoring feedback loop based on signals received from one or more of the sensors 186, 187, and 188, then engine operating parameters may be correspondingly adjusted to prevent further degradation.

Referring now to FIGS. 3A-3C, various configurations of a transition metal catalyst washcoat loaded on a support material are shown. In some examples, the transition metal catalyst washcoat and the support material may be included in one or more of the first catalyst 182, the second catalyst 184, and the emission control device 178 described above with reference to FIGS. 1 and 2. It will be understood that further configurations may be developed within the scope of the present disclosure and the state of the art, and that the specific configurations depicted by FIGS. 3A-3C are not to be taken as limiting.

Referring now to FIG. 3A, a schematic illustration 300 of a catalyst 301 is depicted, wherein the catalyst 301 includes a transition metal catalyst washcoat 302 deposited on a support material 303. The transition metal catalyst washcoat 302 may include one or more transition metals, such as nickel and/or copper. As shown, the support material 303 may include a surface region 303a and a bulk region 303b. The transition metal catalyst washcoat 302 may be deposited onto, and thereby interact directly with, the surface region 303a of the support material 303 via wet impregnation.

The transition metal catalyst washcoat 302 may include an amount of nickel directly loaded on the surface region 303a of the support material 303. In some examples, the amount of nickel may not be sufficient to completely cover the surface region 303a. In other examples, the amount of nickel may completely cover the surface region 303a in a monatomic layer or, in other examples, in a layer several atoms thick. In additional or alternative examples, the amount of nickel may be included in a single layer. For instance, the amount of nickel may completely cover the surface region 303a in a single, monatomic layer, where no other nickel-including layers are loaded thereon. Further, providing the amount of nickel may affect an induction period, or induction time period, of the catalyst 301. For example, including the monatomic layer of nickel may reduce the induction period of the catalyst 301.

A loading of nickel on the surface region 303a of the support material 303 may be greater than 0.000835 g/m$^2$ and less than 0.002505 g/m$^2$. In some examples, the loading of nickel on the surface region 303a may be greater than 0.001 g/m$^2$ and less than 0.002 g/m$^2$. In some examples, the loading of nickel on the surface region 303a may be about 0.00167 g/m$^2$. The loading of nickel may be selected so as to provide a monatomic layer.

Nickel may be present in the catalyst 301 in a total weight ratio of greater than about 4 wt. % and less than about 24 wt. %. In some examples, nickel may be present in the catalyst 301 in the total weight ratio of about 12 wt. %. Further, in some examples, a weight ratio of nickel to cerium (Ni:Ce) may be greater than about 0.12 and less than about 0.93. In some examples, the weight ratio of Ni:Ce may be about 0.40.

The loading of nickel on the surface region 303a of the support material 303 may not be linearly dependent upon the total weight ratio of nickel in the catalyst 301. As a first example, the total weight ratio of nickel in the catalyst 301 may depend in part upon an amount of the support material 303 in the catalyst 301. As a second example, the transition metal catalyst washcoat 302 may include further components therein, which may alter the total weight ratio of nickel in the catalyst 301.

In some examples, the further components in the transition metal catalyst washcoat 302 may include one or more additional transition metals, such as copper. In one example, a weight ratio of copper to nickel (Cu:Ni) may be greater than about 1:99 and less than about 8:92. In some examples, the weight ratio of Cu:Ni may be about 2:98, or 1:49. The copper may serve as a promotor to further decrease the induction period of the catalyst 301, and to promote $NH_3$ decomposition to $N_2$ and $H_2$.

In some examples, the support material 303 may include alumina. In such examples, a molar ratio of alumina to nickel in the catalyst 301 may be limited to less than 0.20. As such, undesirable reactions with nickel and alumina forming catalytically inactive nickel aluminate may be mitigated. In other examples, no alumina may be present in the support material 303.

In additional or alternative examples, the support material 303 may include cerium-based materials. In such examples, the support material 303 may include one or more of cerium metal, ceria, and high-cerium zirconium oxide (e.g., $Ce_{0.75}Zr_{0.25}O_2$). The cerium-based materials may confer additional oxygen storage capacity to the catalyst 301 and may not react with nickel therein.

In one example, the catalyst 301 may be prepared by first combining the support material 303 with a nickel nitrate solution. Deionized water may subsequently be provided to achieve an incipient wetness of the support material 303 and dilute the nickel nitrate solution. After stirring, the diluted nickel nitrate solution may be dried in air in an oven at 150° C. for two hours to obtain a pre-calcination product. The pre-calcination product may then be calcined in air at 600° C. for one hour to remove all organic residues, and thereby obtain the catalyst 301. The catalyst 301 thus obtained may provide improved HC, CO, NO, and $NH_3$ conversion as compared to transition metal catalysts not including nickel. In one example, employing ceria as the support material 303 may further promote such catalytic activities relative to other materials.

Referring now to FIG. 3B, a schematic illustration 320 of a catalyst 321 is depicted, wherein the catalyst 321 includes a layered configuration of the transition metal catalyst washcoat 302 and a precious metal catalyst washcoat 304 deposited on the support material 303. As shown, the support material 303 may include the surface region 303a and the bulk region 303b. Further, the layered configuration may include the precious metal catalyst washcoat 304 deposited onto the surface region 303a of the support material 303, and the transition metal catalyst washcoat 302 further deposited on the precious metal catalyst washcoat 304. In some examples, each of the precious metal catalyst washcoat 304 and the transition metal catalyst washcoat 302 may be deposited via wet impregnation. The precious metal catalyst washcoat 304 may include one or more of platinum, palladium, and rhodium. The precious metal catalyst washcoat 304 may provide additional $NH_3$ decomposition and HC steam reforming functionalities to the catalyst 321.

Referring now to FIG. 3C, a schematic illustration 340 of a third example of the catalyst 341 is depicted, wherein the catalyst 341 includes a zone configuration of the transition metal catalyst washcoat 302 and the precious metal catalyst washcoat 304. As shown, the support material 303 may include the surface region 303a and the bulk region 303b. Further, the zoned configuration may include the precious metal catalyst washcoat 304 being deposited on a first portion of the surface region 303a of the support material 303 and the transition metal catalyst washcoat 302 being deposited on a second, remaining portion of the surface region 303a. In some examples, each of the precious metal catalyst washcoat 304 and the transition metal catalyst washcoat 302 may be deposited via wet impregnation.

Referring now to FIG. 4, schematic diagrams 400, 420, and 440 depict respective example loadings of nickel on a cerium-based support material, such as ceria. In the schematic diagram 400, a nickel layer 401 is loaded on a surface region 402a of a ceria support material at a loading of 0.000510 g/m$^2$. Further, the nickel layer 401 may be present in a total weight ratio of 4 wt. %. The nickel layer 401 may interact directly with the surface region 402a of the ceria support material, and may not be in contact with a bulk region 402b of the ceria support material. As shown in the schematic diagram 400, the nickel layer 401 may not be sufficient to completely cover the surface region 402a of the ceria support material, such that the nickel layer 401 provides about 50% of a theoretical coverage of the surface region 402a of the ceria support material. Correspondingly, the nickel layer 401 may provide limited improvements to catalytic activities. For example, when the nickel layer 401 on the ceria support material is used as an emissions treatment device, such as one of the catalysts 301, 321, 341 as described above with reference to FIGS. 3A-3C, conversion of CO during an induction period may be poor compared to other nickel loadings depicted in FIG. 4.

In the schematic diagram 420, a nickel layer 421 is loaded on a surface region 422a of a ceria support material at a loading of 0.00167 g/m$^2$. Further, the nickel layer 421 may be present in a total weight ratio of 12 wt. %. The nickel layer 421 may interact directly with the surface region 422a of the ceria support material, and may not be in contact with a bulk region 422b of the ceria support material. As shown in the schematic diagram 420, the nickel layer 421 may completely cover the surface region 422a of the ceria support material in a monatomic layer, such that the nickel layer 421 provides about 100% of a theoretical coverage of the surface region 422a of the ceria support material. Correspondingly, the nickel layer 421 may provide approximately maximum theoretical improvements to catalytic activities. For example, when the nickel layer 421 on the ceria support material is used as an emissions treatment device, such as one of the catalysts 301, 321, 341 as described above with reference to FIGS. 3A-3C, conversion of CO during an induction period may be optimized compared to other nickel loadings depicted in FIG. 4.

In the schematic diagram 440, a nickel layer 441 is loaded on a surface region 442a of a ceria support material at a loading of 0.00387 g/m$^2$. Further, the nickel layer 441 may be present in a total weight ratio of 24 wt. %. The nickel layer 441 may interact directly with the surface region 442a of the ceria support material, and may not be in contact with a bulk region 442b of the ceria support material. As shown in the schematic diagram 440, the nickel layer 441 may completely cover the surface region 422a of the ceria support material in a layer several atoms thick, such that the nickel layer 441 provides significantly more than a theoretical coverage of the surface region 442a of the ceria support material. Correspondingly, the nickel layer 441 may provide limited improvements to catalytic activities, as excessive nickel may sinter and thus block active sites. As a result, when the nickel layer 441 on the ceria support material is used as an emissions treatment device, such as one of the catalysts 301, 321, 341 as described above with reference to FIGS. 3A-3C, conversion of CO during an induction period may be between that provided by other nickel loadings depicted in FIG. 4.

Referring now to FIGS. 5A and 5B, plots showing CO conversion and oxygen storage functionalities of example catalysts with respect to respective nickel loadings included therein are depicted. In some examples, the example catalysts may include one or more of the catalysts 301, 321, 341 as described above with reference to FIGS. 3A-3C.

Referring now to FIG. 5A, an example plot 500 showing CO conversion during an induction period and due to a water-gas shift (WGS) reaction (as indicated in relative units along a left y-axis), as well as an oxygen storage capacity (as indicated in μmol O/mol Ni along a right y-axis), of three example catalysts at 500° C. is depicted. Each of the three example catalysts may include a cerium-based support material, such as cerium metal, ceria, or a high-cerium cerium-zirconium oxide. Further, each of the three example catalysts includes a different nickel loading (as indicated in g Ni/m$^2$ Ce along an x-axis). Thus, catalytic activities of a first example catalyst having a lowest nickel loading are indicated by dashed box 501, catalytic activities of a second example catalyst having an intermediate, or optimal, nickel loading are indicated by dashed box 502, and catalytic activities of a third example catalyst having a highest nickel loading are indicated by dashed box 503. As shown, each of the second example catalyst and the third example catalyst have a nickel loading above a theoretical monatomic layer 504.

For each of the example catalysts described with reference to FIG. 5A, the CO oxidation during the induction period is indicated by filled diamonds 505, the CO conversion due to the WGS reaction is indicated by asterisks 506, and the oxygen storage capacity is indicated by open circles 507. As shown, the CO conversion during the induction period at 500° C. is relatively unaffected by varying the nickel loading. However, the second example catalyst, having the nickel loading closest to the theoretical monatomic layer 504, shows the highest CO conversion due to the WGS reaction and the highest oxygen storage capacity of the three example catalysts, indicating that providing too low of a nickel loading limits the CO conversion and oxygen storage functionalities by decreasing a total number of nickel-cerium interaction sites, whereas providing too high of a nickel loading results in significant nickel sintering, similarly limiting the CO conversion and oxygen storage functionalities.

Referring now to FIG. 5B, an example plot 550 showing CO conversion following an induction period and due to a water-gas shift (WGS) reaction (as indicated in relative units along a left y-axis), as well as an oxygen storage capacity (as indicated in μmol O/mol Ni along a right y-axis), of three example catalysts, such as the three example catalysts described above with reference to FIG. 5A, at 600° C. is depicted. Each of the three example catalysts may include a cerium-based support material, such as cerium metal, ceria, or a high-cerium cerium-zirconium oxide. Further, each of the three example catalysts includes a different nickel loading (as indicated in g Ni/m$^2$ Ce along an x-axis). Thus, catalytic activities of a first example catalyst having a lowest nickel loading are indicated by dashed box 551, catalytic activities of a second example catalyst having an intermediate, or optimal, nickel loading are indicated by dashed box 552, and catalytic activities of a third example catalyst having a highest nickel loading are indicated by dashed box 553. As shown, each of the second example catalyst and the third example catalyst have a nickel loading above a theoretical monatomic layer 554.

For each of the example catalysts described with reference to FIG. 5B, the CO oxidation during the induction period is indicated by filled diamonds 555, the CO conversion due to the WGS reaction is indicated by asterisks 556, and the oxygen storage capacity is indicated by open circles 557. Comparing the example plot 550 of FIG. 5B to the example plot 500 of FIG. 5A, largely similar trends in catalytic activities are depicted, which may be attributed to the nickel loadings of the respective example catalysts. However, at 600° C., the second example catalyst may provide significantly more CO conversion as compared to the same catalyst at 500° C., as the induction time period has decreased due to faster reduction of nickel oxide (NiO) therein. As such, the second example catalyst, having the nickel loading closest to the theoretical monatomic layer 554, shows the highest CO conversion and the highest oxygen storage capacity of the three example catalysts, indicating that providing too low of a nickel loading limits the CO conversion and oxygen storage functionalities by decreasing a total number of nickel-cerium interaction sites, whereas providing too high of a nickel loading results in significant nickel sintering, similarly limiting the CO conversion and oxygen storage functionalities.

Referring now to FIG. 6, an example plot 600 of Gibbs free energies of formation of NO (as indicated in kcal/mol along a y-axis) from respective reactions of various metal oxides with $NH_3$ with respect to temperature (as indicated in ° C. along an x-axis) is depicted. Specifically, Gibbs free energies of formation due to reactions of $NH_3$ with stoichiometric amounts of NiO, $Fe_3O_4$, CuO, $Mn_2O_3$, and $MnO_2$ are depicted by curves 601, 602, 603, 604, and 605, respectively.

$NH_3$ generation typically occurs across one or more TWCs disposed in the exhaust passage during rich operating conditions. A nickel-based transition metal catalyst, such as one of the catalysts 301, 321, 341 as described above with reference to FIGS. 3A-3C, disposed downstream of a given TWC may therefore receive $NH_3$ in exhaust gas flowing from the TWC. As shown, of the five metal oxides, nickel(II) oxide (NiO) shows the highest Gibbs free energy of formation of NO (comparing curve 601 to curves 602, 603, 604, and 605), indicating that $NH_3$ oxidation to NO is relatively thermodynamically unfavorable. Further, copper is known to promote nickel-based transition metal catalyst activity. However, as indicated by curve 603, copper(II) oxide (CuO) may promote oxidation of $NH_3$ to NO, which may be undesirable, as NO is a regulated pollutant. Thus, an amount of copper may be optimized in the nickel-based transition metal catalyst so as to retain such promotional effects while limiting $NH_3$ oxidation.

Referring now to FIG. 7, an example plot 700 showing NO conversion (as indicated in relative units on a y-axis) versus NO generation (also referred to as "NO make;" as indicated in relative units on an x-axis) for four example nickel-based transition metal catalysts (such as one of the catalysts 301, 321, 341 as described above with reference to FIGS. 3A-3C) is depicted. Each of the four example catalysts may include a nickel loading of 0.00167 g/m² loaded on a cerium-based support material such as $Ce_{0.75}Zr_{0.25}O_2$. Further, each of the four example catalysts may have a different copper to nickel (Cu:Ni) ratio, where a point 701 corresponds to a first example catalyst with a Cu:Ni ratio of 0:100, a point 702 corresponds to a second example catalyst with a Cu:Ni ratio of 2:98, or 1:49, a point 703 corresponds to a third example catalyst with a Cu:Ni ratio of 8:92, or 2:23, and a point 704 corresponds to a fourth example catalyst with a Cu:Ni ratio of 1:1.

Both nickel and the cerium included in the cerium-based support material may provide oxygen storage functionalities. Further, for the example catalysts which include copper, stored oxygen therefrom may be transferred to the copper to form CuO. As CuO may promote undesired NO generation via $NH_3$ oxidation, limiting copper in a given catalyst to 1:49 with the nickel loading of 0.00167 g/m² may result in increased NO conversion activity while limiting NO generation (as shown by comparing the point 702 to the points 701, 703, and 704).

Referring now to FIG. 8A, an example plot 800 showing $NH_3$ conversion (as indicated in relative units along a y-axis) for three example exhaust gas treatment systems with respect to respective exhaust gas inlet temperature (as indicated in ° C. along an x-axis) is depicted. Each of the example exhaust gas treatment systems includes a CC TWC disposed in respective exhaust passages. A curve 801 depicts $NH_3$ conversion for a first example exhaust gas treatment system, which may further include a UB TWC disposed in the exhaust passage. A curve 802 depicts $NH_3$ conversion for a second example exhaust gas treatment system, which may further include a transition metal catalyst, such as one of the catalysts 301, 321, 341 as described above with reference to FIGS. 3A-3C, disposed downstream of a UB TWC in the exhaust passage. A curve 803 depicts $NH_3$ conversion for a third example exhaust gas treatment system, which may further include a transition metal catalyst, such as one of the catalysts 301, 321, 341 as described above with reference to FIGS. 3A-3C, disposed upstream of a UB TWC in the exhaust passage.

As shown, each of the second and third example exhaust gas treatment systems (as shown by curves 802 and 803, respectively), which each include respective transition metal catalysts, exhibit increased $NH_3$ conversion efficiency relative to the first example exhaust gas treatment system (as shown by curve 801). Further, at exhaust gas inlet temperatures above about 450° C., the third exhaust gas treatment system (as shown by curve 803), which includes the transition metal catalyst disposed between the CC TWC and the UB TWC, exhibits increased $NH_3$ conversion efficiency relative to the second example exhaust gas treatment system (as shown by curve 802), which includes the transition metal catalyst disposed downstream of each of the CC TWC and the UB TWC.

Referring now to FIG. 8B, an example plot 850 showing NO conversion (as indicated in relative units along a y-axis) for three example exhaust gas treatment systems, such as the three example exhaust gas treatment systems described above with reference to FIG. 8A, with respect to respective exhaust gas inlet temperature (as indicated in ° C. along an x-axis) is depicted. As such, each of the example exhaust gas treatment systems includes a CC TWC disposed in respective exhaust passages. A curve 851 depicts NO conversion for a first example exhaust gas treatment system, which may further include a UB TWC disposed in the exhaust passage. A curve 852 depicts NO conversion for a second example exhaust gas treatment system, which may further include a transition metal catalyst, such as the one of the catalysts 301, 321, 341 as described above with reference to FIGS. 3A-3C, disposed downstream of a UB TWC in the exhaust passage. A curve 853 depicts NO conversion for a third example exhaust gas treatment system, which may further include a transition metal catalyst, such as one of the catalysts 301, 321, 341 as described above with reference to FIGS. 3A-3C, disposed upstream of a UB TWC in the exhaust passage.

As shown, each of the second and third example exhaust gas treatment systems (as shown by curves 852 and 853, respectively), which each include respective transition metal catalysts, exhibit increased NO conversion efficiency relative to the first example exhaust gas treatment system (as shown by curve 851). As such, by comparing to the example plot 800 as described above with reference to FIG. 8A, the transition metal catalyst may provide increased $NH_3$ decomposition to $N_2$ and $H_2$ as compared to a TWC alone. Specifically, since NO is being efficiently converted at the transition metal catalyst, little $NH_3$ is being oxidized to NO, and is instead decomposing to $N_2$ and $H_2$. Further, at exhaust gas inlet temperatures above about 350° C., the third exhaust gas treatment system (as shown by curve 853), which includes the transition metal catalyst disposed between the CC TWC and the UB TWC, exhibits increased NO conversion efficiency relative to the second example exhaust gas treatment system (as shown by curve 852), which includes the transition metal catalyst disposed downstream of each of the CC TWC and the UB TWC. As such, and considering the example plot 800 as described above with reference to FIG. 8A, the third exhaust gas treatment system may catalyze the decomposition of $NH_3$ to $N_2$ and $H_2$ (that is, without unwanted NO generation via $NH_3$ oxidation) at a conversion efficiency of greater than 70% at exhaust gas inlet temperatures of greater than 600° C.

In this way, a transition metal catalyst is provided with various catalytic functionalities for vehicle exhaust emissions control. For example, the transition metal catalyst may improve oxygen storage capacity and water-gas shift functionality, and mitigate ammonia and nitric oxide production across a broad temperature range. In one example, the transition metal catalyst may include a monatomic layer of nickel. A technical effect of limiting nickel to a monatomic layer is that problematic sintering in high-temperature exhaust conditions may be reduced. Further, the transition metal catalyst may be washcoated onto a cerium-based support material. A technical effect of utilizing the cerium-based support material is that cerium exhibits limited or no reactivity with nickel in the transition metal catalyst. As such, the nickel may remain catalytically active for a longer duration than in examples wherein the support material is composed of a more reactive material (e.g., alumina).

An example of catalyst comprises a support material comprising one or more of cerium metal, ceria, and high-cerium cerium-zirconium oxide, and a transition metal catalyst loaded on the support material, the transition metal catalyst comprising nickel and copper, wherein nickel in the transition metal catalyst is included in a monatomic layer loaded on the support material. A first example of the catalyst further includes wherein a loading of nickel in the transition metal catalyst on the support material is greater than 0.001 $g/m^2$ and less than 0.002 $g/m^2$. A second example of the catalyst, optionally including the first example of the catalyst, further includes wherein nickel is present at about 12 wt. %. A third example of the catalyst, optionally including one or more of the first and second examples of the catalyst, further includes wherein a weight ratio of copper to nickel is about 1:49. A fourth example of the catalyst, optionally including one or more of the first through third examples of the catalyst, further includes wherein the high-cerium cerium-zirconium oxide is $Ce_{0.75}Zr_{0.25}O_2$. A fifth example of the catalyst, optionally including one or more of the first through fourth examples of the catalyst, further includes wherein alumina is present at a molar ratio of alumina to nickel of less than 0.20. A sixth example of the catalyst, optionally including one or more of the first through fourth examples of the catalyst, further includes wherein no alumina is present.

An example of a system for a vehicle comprises a first emissions treatment device comprising a cerium-based support material and a transition metal catalyst washcoat, the transition metal catalyst washcoat comprising nickel and copper, with nickel in the transition metal catalyst washcoat included in only a monatomic layer loaded on the cerium-based support material, and a second emissions treatment device comprising a first three-way catalyst. A first example of the system further includes wherein the second emissions treatment device is disposed upstream of the first emissions treatment device in an exhaust passage of the vehicle. A second example of the system, optionally including the first example of the system, further comprises a third emissions treatment device comprising a second three-way catalyst, wherein the third emissions treatment device is disposed downstream of the first emissions treatment device in the exhaust gas passage of the vehicle. A third example of the system, optionally including one or more of the first and second examples of the system, further includes wherein the second emissions treatment device is disposed downstream of the first emissions treatment device in an exhaust passage of the vehicle. A fourth example of the system, optionally including one or more of the first through third examples of the system, further includes wherein each of the first emissions treatment device and the second emissions treatment device is disposed in an exhaust gas passage of the vehicle, and the first emissions treatment device and the second emissions treatment device are physically separated from one another. A fifth example of the system, optionally including one or more of the first through fourth examples of the system, further comprises a gasoline particulate filter (GPF) disposed in the exhaust gas passage of the vehicle, wherein the second emissions treatment device is coated on an upstream side of the GPF, and the first emissions treatment device is coated on a downstream side of the GPF. A sixth example of the system, optionally including one or more of the first through fifth examples of the system, further includes wherein the first emissions treatment device further comprises a precious metal catalyst washcoat comprising one or more of platinum, palladium, and rhodium. A seventh example of the system, optionally including one or more of the first through sixth examples of the system, further includes wherein the transition metal catalyst washcoat and the precious metal catalyst washcoat are arranged in a layered configuration on the cerium-based support material. An eighth example of the system, optionally including one or more of the first through seventh examples of the system, further includes wherein the transition metal catalyst washcoat and the precious metal catalyst washcoat are arranged in a zoned configuration on the cerium-based support material.

An example of a method for treating exhaust gas in a vehicle comprises flowing the exhaust gas through a first emissions treatment device, the first emissions treatment device comprising a first three-way catalyst, and flowing the exhaust gas through a second emissions treatment device, the second emissions treatment device comprising a cerium-based support material and a transition metal catalyst that catalyzes decomposition of ammonia in the exhaust gas, wherein the transition metal catalyst comprises nickel and copper, and nickel in the transition metal catalyst is included in a monatomic layer loaded on the cerium-based support material. A first example of the method further comprises flowing the exhaust gas through a third emissions treatment device, the third emissions treatment device comprising a second three-way catalyst, wherein the second emissions treatment device is disposed in an exhaust gas passage of the vehicle between the first emissions treatment device and the third emissions treatment device. A second example of the method, optionally including the first example of the method, further includes wherein the catalyzing the decomposition of ammonia includes decomposing ammonia to nitrogen gas and hydrogen gas at a conversion efficiency of greater than 70% at an exhaust gas temperature of greater than 600° C. A third example of the method, optionally including one or more of the first and second examples of the method, further includes wherein the transition metal catalyst further catalyzes oxidation of carbon monoxide in the exhaust gas and storage of oxygen from the exhaust gas, where the catalyzing the oxidation of carbon monoxide includes oxidizing carbon monoxide during an induction period and/or by a water-gas shift reaction.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for treating exhaust gas in a vehicle, comprising:
   flowing the exhaust gas through a first emissions treatment device, the first emissions treatment device comprising a first three-way catalyst, the first three-way catalyst comprising at least one precious metal in a washcoat; and
   flowing the exhaust gas through a second emissions treatment device, the second emissions treatment device comprising a cerium-based support material and a transition metal catalyst that catalyzes decomposition of ammonia in the exhaust gas;
   wherein the transition metal catalyst comprises nickel and copper; and
   nickel in the transition metal catalyst is included in a monatomic layer loaded on the cerium-based support material.

2. The method of claim 1, further comprising:
   flowing the exhaust gas through a third emissions treatment device, the third emissions treatment device comprising a second three-way catalyst, the second three-way catalyst comprising at least one precious metal in a washcoat;
   wherein the second emissions treatment device is disposed in an exhaust gas passage of the vehicle between the first emissions treatment device and the third emissions treatment device.

3. The method of claim 2, wherein the catalyzing the decomposition of ammonia includes decomposing ammonia to nitrogen gas and hydrogen gas at a conversion efficiency of greater than 70% at an exhaust gas temperature of greater than 600° C.

4. The method of claim 1, wherein the transition metal catalyst further catalyzes oxidation of carbon monoxide in the exhaust gas and storage of oxygen from the exhaust gas, wherein the catalyzing the oxidation of carbon monoxide includes oxidizing carbon monoxide during an induction period and/or by a water-gas shift reaction.

5. The method of claim 1, wherein a loading of the nickel in the transition metal catalyst on the cerium-based support material is greater than $0.001$ g/m$^2$ and less than $0.002$ g/m$^2$.

6. The method of claim 1, wherein the nickel is present at about 12 wt. %.

7. The method of claim 1, wherein a weight ratio of the copper to the nickel is about 1:49.

8. The method of claim 1, wherein the cerium-based support material is $Ce_{0.75}Zr_{0.25}O_2$.

9. The method of claim 8, wherein alumina is present in the second emissions treatment device at a molar ratio of the alumina to the nickel of less than 0.20.

10. The method of claim 1, wherein no alumina is present in the second emissions treatment device.

* * * * *